United States Patent
Holliday

(10) Patent No.: US 7,701,075 B2
(45) Date of Patent: Apr. 20, 2010

(54) HYBRID ELECTRICAL POWER SOURCE COMBINING STIRLING ENGINE DRIVEN ALTERNATOR WITH SUPPLEMENTING ELECTRICAL ENERGY STORAGE

(75) Inventor: Ezekiel S. Holliday, Belpre, OH (US)

(73) Assignee: Sunpower, Inc., Athens, OH (US)

( * ) Notice: Subject to any disclaimer, the term of this patent is extended or adjusted under 35 U.S.C. 154(b) by 0 days.

(21) Appl. No.: 12/328,981

(22) Filed: Dec. 5, 2008

(65) Prior Publication Data

US 2009/0206667 A1    Aug. 20, 2009

Related U.S. Application Data

(60) Provisional application No. 60/992,487, filed on Dec. 5, 2007.

(51) Int. Cl.
*F02B 63/04* (2006.01)
(52) U.S. Cl. .................. 290/40 C; 290/40 B; 290/1 R; 180/65.4
(58) Field of Classification Search ............... 290/40 C, 290/40 B, 1 R
See application file for complete search history.

(56) References Cited

U.S. PATENT DOCUMENTS

| | | | | |
|---|---|---|---|---|
| 6,016,598 | A * | 1/2000 | Middelman et al. | ........... 29/830 |
| 6,623,954 | B1 * | 9/2003 | Spade et al. | ........... 435/274 |
| 6,690,585 | B2 | 2/2004 | Betts-LaCroix | |
| 6,882,063 | B2 | 4/2005 | Droppo et al. | |
| 7,200,994 | B2 | 4/2007 | Chertok | |
| 7,227,278 | B2 | 6/2007 | Realmuto et al. | |

\* cited by examiner

*Primary Examiner*—T C Patel
*Assistant Examiner*—Iraj A Mohandesi
(74) *Attorney, Agent, or Firm*—Frank H. Foster; Kremblas Foster Intellectual Property

(57) ABSTRACT

An electrical power source including a free-piston Stirling engine driving an alternator to supply power through a bus to a user load and controlled by an engine/alternator controller. A bidirectional DC/DC converter is connected between a battery and the bus. The stroke of the engine piston is modulated between a maximum and a minimum stroke to maintain the bus voltage at a design nominal bus voltage ($V_1$), and charge the battery if it is not charged, when and so long as the bus voltage does not fall below a design nominal bus voltage ($V_1$). The Stirling engine is operated at its maximum piston stroke, and the battery is charged if it is not charged, when the bus voltage is in the range between the design nominal bus voltage ($V_1$) and a design minimum battery charging bus voltage ($V_2$). The Stirling engine is operated at its maximum piston stroke and the battery is disconnected from the bus so it can not charge when the bus voltage is in the range between the design minimum battery charging bus voltage ($V_2$) and a design minimum bus voltage ($V_3$). The Stirling engine is operated at its maximum piston stroke and power is applied from the battery to the bus for maintaining the bus voltage at the design minimum bus voltage ($V_3$) when the power supplied from the alternator operating at its maximum stroke is less than the power demand of the load.

3 Claims, 4 Drawing Sheets

Fig. 5

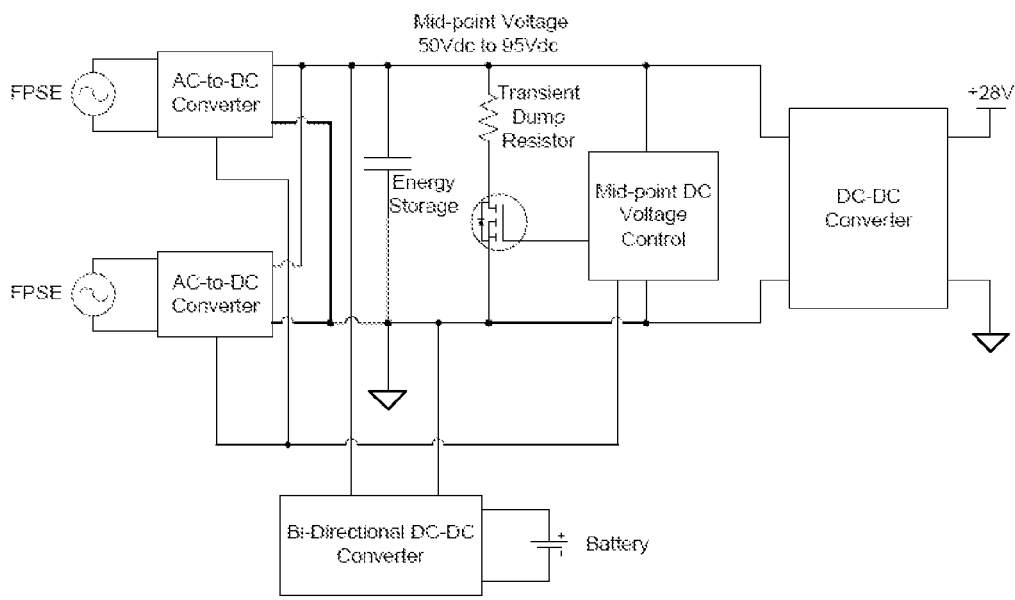

Fig. 6

| CIRCUIT STATE | | | OPERATING MODE | |
|---|---|---|---|---|
| BATTERY CONDITION | BUS VOLTAGE | | BATTERY | POWER |
| NOT FULLY CHARGED | $V_2 < V \leq V_1$ | | CHARGING | SUPPLIED BY ALTERNATOR |
| FULLY CHARGED | $V_2 < V \leq V_1$ | | DISCONNECTED | SUPPLIED BY ALTERNATOR |
| NOT FULLY CHARGED | $V_3 < V \leq V_2$ | | DISCONNECTED | SUPPLIED BY ALTERNATOR |
| FULLY CHARGED | $V_3 < V \leq V_2$ | | DISCONNECTED | SUPPLIED BY ALTERNATOR |
| NOT FULLY CHARGED | $V = V_3$ | | CONNECTED | SUPPLIED BY ALTERNATOR AND BATTERY |
| FULLY CHARGED | $V = V_3$ | | CONNECTED | SUPPLIED BY ALTERNATOR AND BATTERY |
| | | | | |

HYBRID ELECTRICAL POWER SOURCE COMBINING STIRLING ENGINE DRIVEN ALTERNATOR WITH SUPPLEMENTING ELECTRICAL ENERGY STORAGE

CROSS-REFERENCES TO RELATED APPLICATIONS

This application claims the benefit of U.S. Provisional Application No. 60/992,487 filed Dec. 5, 2007.

STATEMENT REGARDING FEDERALLY-SPONSORED RESEARCH AND DEVELOPMENT

This invention was made with Government support pursuant to a subcontract under contract RTI 05-1-11-15-050 awarded by US Army CECOM RDEC. The Government has certain rights in the invention.

REFERENCE TO AN APPENDIX (Not Applicable)

BACKGROUND OF THE INVENTION

1. Field of the Invention

This invention relates generally to portable or transportable electrical power supply systems such as fuel driven generators and batteries and more particularly relates to a hybrid combination of a power generating system having an alternator driven by a Stirling engine and a storage battery or other device for storing electrical energy.

2. Description of the Related Art

An extensive variety of electrical power supply systems have been known in the prior art for well over a century for powering the many electrical devices available for assisting human effort. Portable systems offer the opportunity to use such electrical devices in remote areas where electrical power is unavailable or inconvenient.

Some of the most common portable electrical power sources are storage batteries and they come in an extensive variety of designs. The term battery is used herein to generically include rechargeable storage batteries and other rechargeable electrical energy storage devices. For example, such electrical energy storage devices would also include capacitor banks or rechargeable fuel cells. Where there is a need for a longer term supply of electrical power, power supply systems are required that can generate electrical power from the energy in available fuels and apply that power to both recharging batteries and to meet the power demands of the various user loads presented by the electrical devices needed by the user.

It is well known in the art to connect a user load to an electrical power generating system or, alternatively, to connect a battery to the generating system in order to charge the battery when it has become discharged. However, many such systems require changing the manual connection of the load, generating system and battery each time the mode of operation is changed between the modes of the generating system driving the load, the generating system charging the battery and the battery driving the load.

Another problem inherent in all electrical power generating systems is that they have a maximum output power at which they can maintain an output voltage that at least meets the minimum output voltage required by the user load. Because of the internal resistance of all generators and batteries, increased power delivery causes a decline in output voltage. Eventually, as output power increases, electrical output power exceeds the power at which a selected minimum output voltage can be maintained and output voltage drops below the minimum voltage required by the user load. The load must be disconnected from the generating system or its load demand reduced in order to permit it to continue operating and/or to avoid damage to the user load. As a result, the power supplied to the user load is limited to the maximum power output that the generating system can deliver. This limitation is particularly restrictive for a user load that, only for relatively brief time intervals, exceeds the power delivery capacity of the generating system.

One portable electrical power generating system that offers particular advantages is the combination of a Stirling engine driving a linear alternator that charges a battery. In such prior art systems, (1) DC power is available from the battery, (2) AC and/or DC power are available from the alternator, the DC implementation requiring an intermediate rectifier, and (3) the alternator can be used for charging the battery.

As with most portable devices, smaller size and weight are desirable characteristics in order to facilitate transportation and handling. Another desirable characteristic for an electrical power generating system is a high peak power delivery capacity for the reasons described above. Although electrical power generating systems can be designed to provide nearly any desired power delivery capacity, with portable generating systems the power generating capacity is inversely related to the size and weight of the system which presents a design tradeoff challenge.

Different electrically powered devices not only present different load demands to an electrical power generating system, but the load demand of many devices can vary, often widely, during use as a result of variations in operating conditions. As a result, there are often time intervals of operation during which the power generating system may be connected to a load that present an unusually high power demand for a relatively short time interval. Conventionally, portable electrical power supply systems are designed to deliver a maximum power equal to the expected peak power. This means that under much, and ordinarily most, of its operating lifetime, the power supply system will be supplying power below this maximum capacity with the remaining capacity being in reserve to meet the temporary peak power demand. Consequently, with this conventional design, for 100% of its operating lifetime, the portable generating system is larger and has a greater weight than is needed most of the time. Only during the relatively short time intervals of peak power demand does it utilize the full benefit of 100% of its weight and size.

It is a purpose and feature of the invention to provide an apparatus and method for operating an electrical power supply system that is a hybridized combination of a Stirling engine driving a linear alternator that can charge a battery, but is also able to deliver a peak power to a load even when the peak power demand exceeds the maximum power that the alternator is able to supply under long term steady state conditions. This allows the load demand of the user's load to exceed the power output maximum of the Stirling generating system for a limited, though extensive, period of time. For example, the invention permits an electrical power supply system of this type to be designed with an engine/alternator combination that has a maximum capacity for continuous delivery of 130 $W_e$ but the hybrid electrical power supply system is capable of delivering 230 $W_e$ for up to 30 minutes. This allows the engine/alternator to have only a size and weight that makes it capable of delivering up to 130 $W_e$ rather than the increased size and weight necessary to deliver up to 230 $W_e$.

BRIEF SUMMARY OF THE INVENTION

An electrical power source has a free-piston Stirling engine driving an alternator and has a battery. A Stirling engine/alternator controller modulates the piston stroke between a maximum and a minimum stroke to maintain the bus voltage at a design nominal bus voltage ($V_1$) when and so long as the bus voltage does not fall below the design nominal bus voltage ($V_1$) and charges the battery if it is not charged. The Stirling engine/alternator controller also maintains the maximum piston stroke when the bus voltage falls below the design nominal bus voltage ($V_1$). A bidirectional DC/DC converter is connected between the battery and the bus. The converter includes (1) a voltage sensor to sense the voltage of the bus, (2) a battery charge state sensor, and (3) a control logic circuit connected to an output of the voltage sensor and to an output of battery charge state sensor and controlling the state of the bidirectional DC/DC converter.

The invention is operated by:

(a) modulating the stroke of the engine piston between a maximum and a minimum stroke to maintain the bus voltage at a design nominal bus voltage (V1) and charging the battery if it is not charged, when and so long as the bus voltage does not fall below the design nominal bus voltage (V1);

(b) operating the Stirling engine at the maximum piston stroke and charging the battery if it is not charged when the bus voltage is in the range between the design nominal bus voltage (V1) and a design minimum battery charging bus voltage (V2) that is less than the design nominal bus voltage (V1);

(c) operating the Stirling engine at the maximum piston stroke and disconnecting the battery so it can not charge when the bus voltage is in the range between the design minimum battery charging bus voltage (V2) and a design minimum bus voltage (V3) that is less than the design minimum battery charging bus voltage (V2); and (d) operating the Stirling engine at the maximum piston stroke and applying power from the battery to the bus for maintaining the bus voltage at the design minimum bus voltage (V3) when the power supplied from the alternator operating at its maximum stroke is less than the power demand of the load.

BRIEF DESCRIPTION OF THE SEVERAL VIEWS OF THE DRAWINGS

FIG. 5 is a block diagram illustrating an alternative embodiment of the invention.

FIG. 6 is a table showing the operating states of embodiments of the invention.

Figure 1:
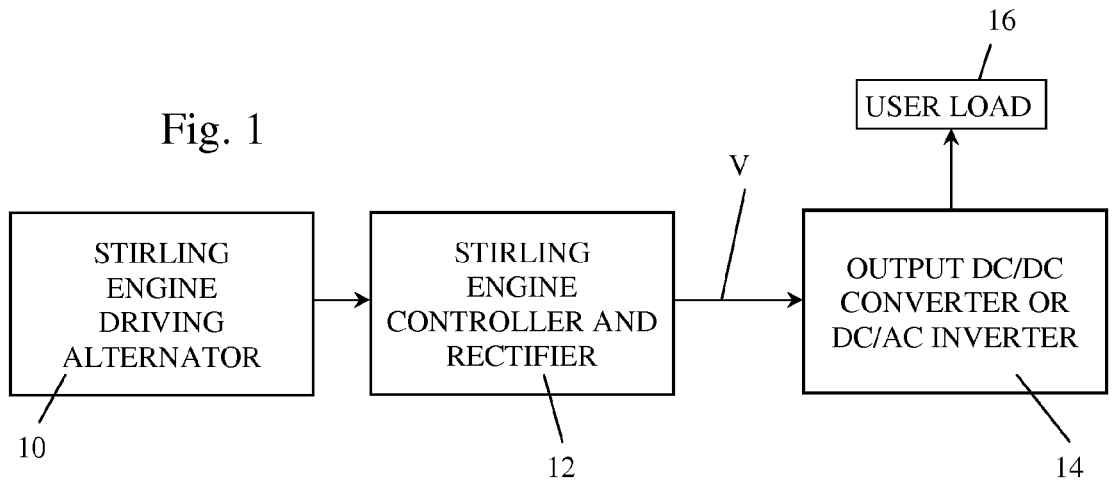
FIG. 1 is a block diagram of a prior art generating system.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

FIG. 1 illustrates an electrical power generating system that includes a free-piston Stirling engine driven alternator 10 and is known in the prior art. The free-piston Stirling engine is the subject of many patents and other public disclosures and includes a piston and displacer that are driven in periodic reciprocation by the application of heat to the heat accepting portion of the engine and removal of heat from the heat rejecting portion of the engine. The Stirling engine and the alternator that it drives are advantageously integrated in the same frame or case. A combination Stirling engine driving an alternator and its controller and rectifier that is suitable for use in embodiments of the present invention is illustrated and described in U.S. Pat. No. 7,453,241 which is herein incorporated by reference. An alternative combination Stirling engine driving an alternator and its controller and rectifier that is suitable for use in embodiments of the present invention is illustrated and described in patent application Ser. No. 11/760,842 which is herein incorporated by reference. An important characteristic of a combination Stirling engine driving an alternator and its controller and rectifier that is suitable for use in embodiments of the present invention is that such a system maintains the maximum Stirling engine piston stroke even when its bus or output voltage declines below its nominal value as a result of increased electrical power loading of the system.

The output from the Stirling engine driven alternator 10 is coupled to a rectifier, filter and control circuit 12. The rectifier is a switching mode rectifier and the electronic control senses electrical and engine parameters and controls the stroke of the Stirling engine and the rectified output voltage by controlling the switching of the switching mode rectifier.

The rectified and filtered output from the rectifier, filter and control circuit 12 provides a bus voltage V (FIG. 1), described in more detail in U.S. Pat. No. 7,453,241 and the above cited patent application. The bus is a pair of electrical nodes internal to the entire system with an energy storing device, such as a capacitor, connected across it and having an intermediate or mid-point voltage. The bus is ordinarily connected to an output DC/DC converter or a DC/AC inverter 14 that conditions the bus voltage, such as by regulating it and/or transforming it to a different magnitude and/or inverting it to an AC output. The converter or inverter consequently provides a more stable output voltage at a magnitude and type appropriate for the intended user load 16. However, it is also possible that the bus can directly provide the output if such conditioning is unnecessary for the intended user load.

Figure 2:
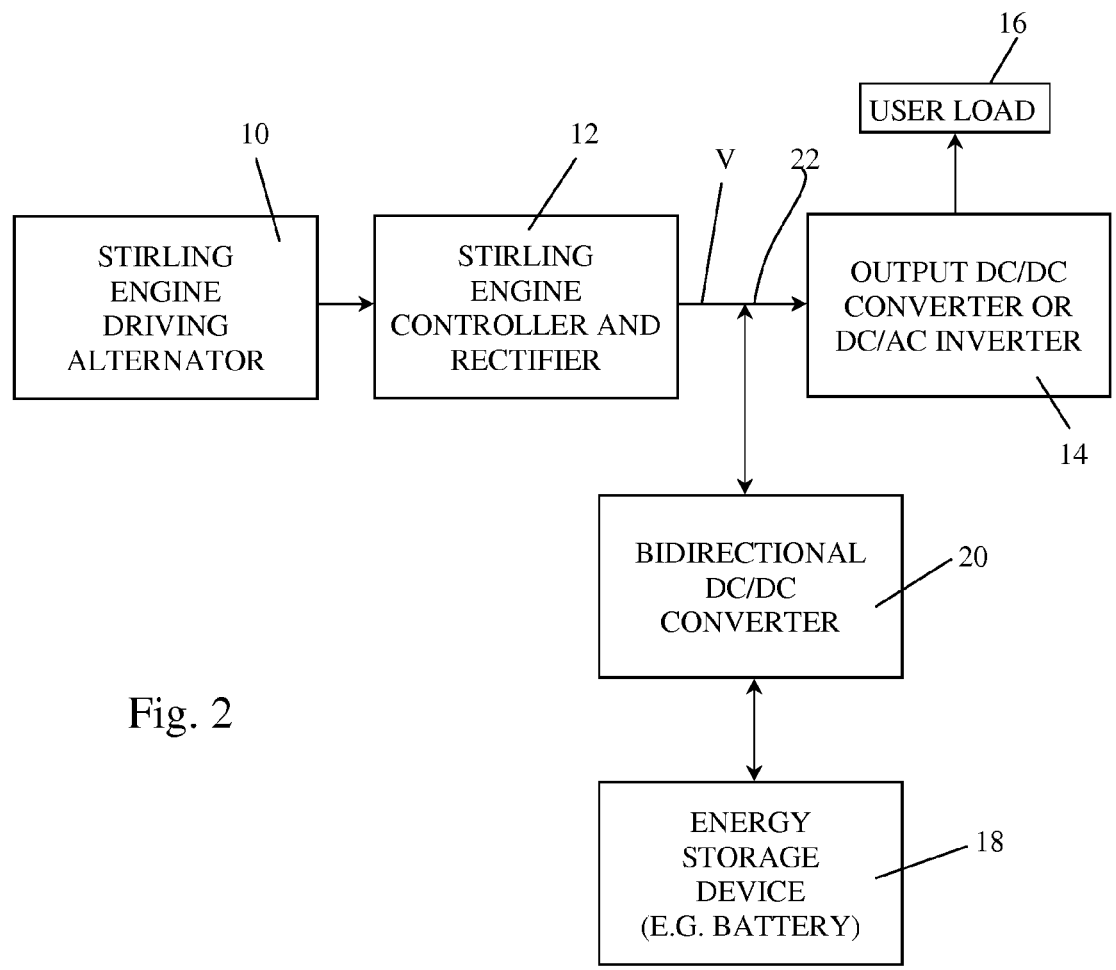
FIG. 2 is a block diagram illustrating the apparatus of the preferred invention.

FIG. 2 illustrates the generating circuit of FIG. 1 with a bidirectional DC/DC converter 20 and a battery 18 added to it in accordance with the invention. The battery 18 is connected through the bidirectional DC/DC converter 20 to the bus 22. The DC/DC converter 20 converts a DC voltage at one DC level to a DC voltage at another DC level. Consequently, the battery voltage can be at a different DC voltage than the bus voltage V. Furthermore, a bidirectional DC/DC converter can do that in either direction under the control of a control circuit, typically including a digital signal processor or microcontroller. Bidirectional DC/DC converters typically include sensing circuits that sense the voltage at each opposite pair of its terminals and apply a signal representing the sensed voltage to its control circuit. Bidirectional DC/DC converters are known in the prior art and the logic controls for them are also shown in the prior art. For example, such devices and circuits are illustrated in U.S. Pat. Nos. 6,690,585, 6,882,063, and 7,227,278 which are herein incorporated by reference. Because a bidirectional DC/DC converter preferably uses a microprocessor-based control circuit and the Stirling engine controller also uses a microprocessor-based control circuit, the two control functions can be merged into a single microprocessor-based controller that controls both the Stirling engine stroke and the operation of the bidirectional DC/DC converter 20.

Figure 4:
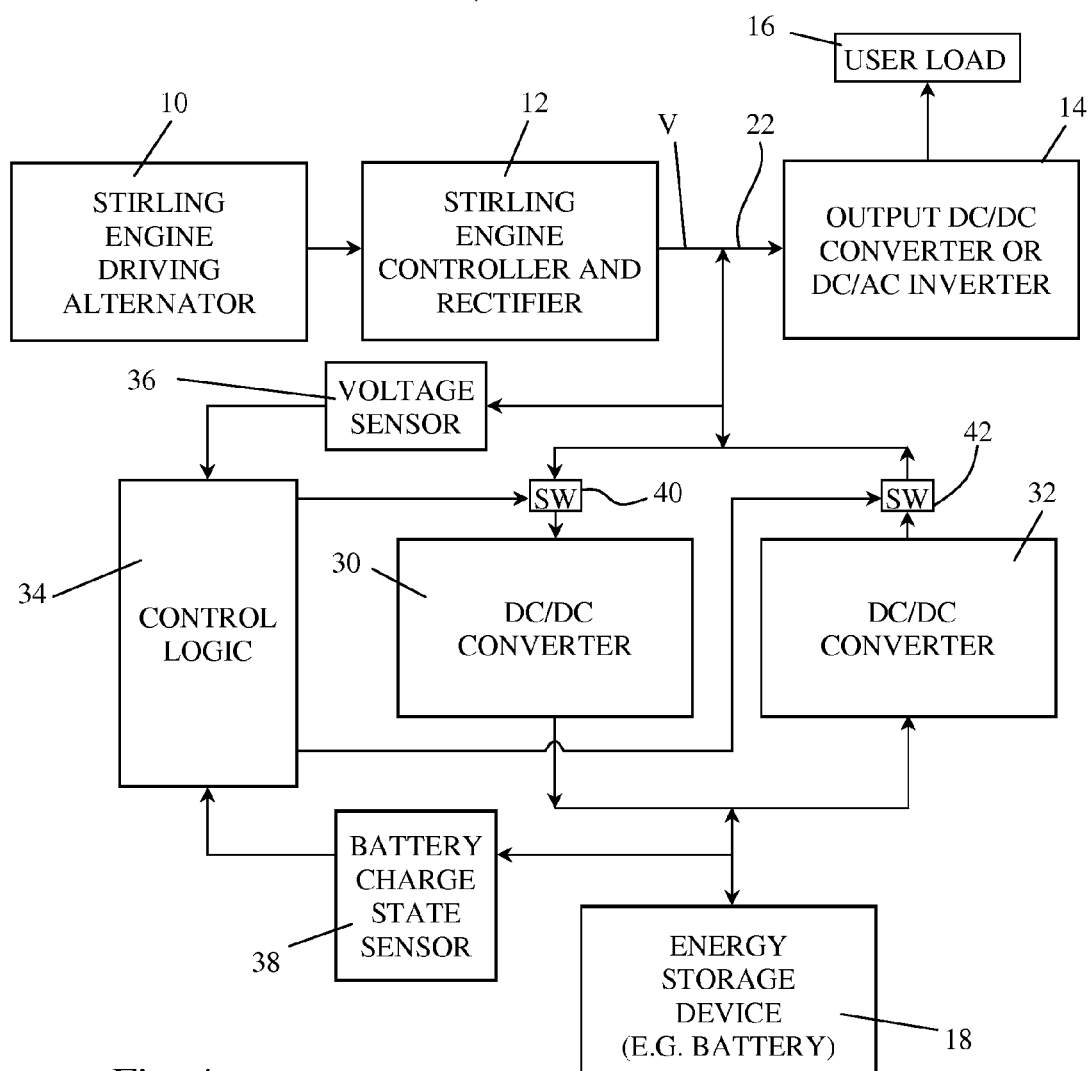
FIG. 4 is a block diagram illustrating an alternative embodiment of the invention and logic controls embodying the invention.

FIG. 4 illustrates a bidirectional DC/DC converter that may be used in an embodiment of the invention but is shown and described principally to illustrate the principles of operation. The components in FIG. 4 that are identical to those in FIGS. 1 and 2 have the same reference numerals and their description is not repeated. A pair of mono-directional DC/DC converters 30 and 32 are connected in opposite directions through switches 40 and 42 respectively between the bus 22 and the battery 18. The DC/DC converter 30 is used for battery charging while the other DC/DC converter 32 is used for supplying power from the battery 18 to the bus 22. Each converter has a switch for switching it into or out of functional connection to the bus 22. The two converters 30 and 32 are never simultaneously connected to the bus 22.

A bus voltage sensor 36 and a battery charge state sensor 38, typically a voltage sensor, each provide a signal to the control logic circuit 34, that is typically microprocessor based. Outputs of the control logic circuit 34 are connected to the switches 40 and 42 for switching the switches ON and OFF in accordance with the controlling software that operates the DC/DC converters 30 and 32 in accordance with the method of the invention. Consequently, the control logic circuit 34 is able to controllably place the bidirectional DC/DC converter in any one of three states: (1) both switches 40 and 42 are opened so neither DC/DC converter 30 or DC/DC converter 32 is operably connected between the bus 22 and the battery 18; (2) switch 40 is closed and switch 42 is opened so that the battery is charged from the bus 22 through converter 30; and (3) switch 40 is opened and switch 42 is closed so that power can be supplied from the battery to the bus 22 through converter 32.

The prior art has disclosed more sophisticated bidirectional DC/DC converters that may be used in an embodiment of the invention. They typically have one converter circuit and switch its operation between the states described above by varying the operation of their circuit elements under the control of their control circuits. Additionally, bidirectional DC/DC converters know in the prior art technology also use filtering and regulation circuits for the well known purposes of minimizing or eliminating AC content and maintenance of a more constant or stable voltage magnitude as the loading through them varies. These features are preferably included in bidirectional DC/DC converters that are used in embodiments of the invention.

FIG. 5 shows another alternative embodiment of the invention that is like the above referenced U.S. Pat. No. 7,453,241 and the above identified application but has two free-piston Stirling engine/alternator pairs FPSE, two rectifier and controllers (identified as AC-to-DC Converter) supplying power to a bus to which the energy storage capacitor is connected and a bidirectional DC/DC converter. The bidirectional DC/DC converter is operated like the other bidirectional DC/DC converters described herein.

Figure 3:
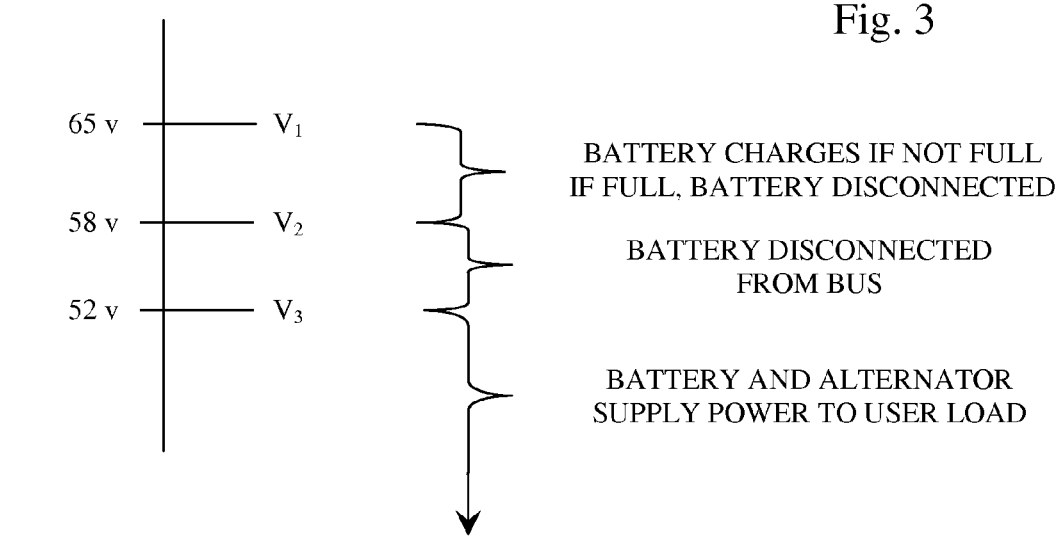
FIG. 3 is a graphical illustration of the bus voltage levels and the corresponding logic control functions.

In order to describe the operation of the invention, the voltage levels that are used and the ranges between them are given names. They are shown in FIG. 3, along with example values, and in FIG. 6 and may be defined as follows:

V=the "bus voltage", a circuit variable. The bus voltage V is shown in FIGS. 1, 2 and 4, is referred to as "Mid-point Voltage" in FIG. 5 and is similarly identified in the above referenced patent and patent application.

$V_1$=the "design nominal bus voltage". $V_1$ is the voltage that the Stirling engine controller maintains by modulating the stroke of the engine between the minimum engine stroke and the maximum stroke. At load power demands beyond the power delivery capacity of the alternator, the bus voltage V will fall below $V_1$ because of the internal resistance of the alternator circuit.

$V_2$=the "design minimum battery charging bus voltage". $V_2$ is the design minimum bus voltage that the alternator alone can maintain and still supply all the power demand of the load and also charge the battery. So long as the sum of the power required by the load and the power to charge the battery does not exceed the power that the alternator circuit can supply, the bus voltage is maintained at least at $V_2$.

$V_3$=the "design minimum bus voltage". The bus voltage level $V_3$ is a minimum voltage that can be applied to the user load and still permit it to operate properly and not be damaged. So long as the power required by the load alone does not exceed the power that the alternator circuit can supply, the bus voltage will be maintained above $V_3$ by power from the alternator alone. When the power demand of the load exceeds the power that the alternator circuit can supply and still maintain the bus voltage above $V_3$, and therefore the bus voltage falls to $V_3$ (or below), power must be supplied by the battery to meet the demand of the load and maintain the bus voltage at $V_3$.

The particular values of $V_1$, $V_2$, and $V_3$ and the permissible voltage range from $V_1$ to $V_3$ that are used in an implementation of the invention are dependent upon and are chosen by the designer based upon the capability and other specifications of the Stirling engine driven alternator and upon the specifications of the expected user loads. The choices may be assisted by laboratory testing of prototypes or models.

$V_2 < V \leq V_1$ is the bus voltage range in which the bus voltage can be maintained and the battery can also be charged.

$V_3 < V \leq V_2$ is the bus voltage range in which the bus voltage can be maintained in this range by power from the alternator but the power demand of the load is so high that the battery can not also be charged. Therefore, the bidirectional DC/DC converter disconnects the battery from the bus in order to avoid the additional loading of battery charging. Of course, if the battery is disconnected, for example when it is charged, and the load power demand is less than the alternator circuit can supply, a bus voltage higher than $V_2$ can be maintained.

$V = V_3$ is the bus voltage at which the battery must be connected through the bidirectional DC/DC converter to the bus so the battery can supply power that supplements the power supplied by the alternator circuit in order to maintain the bus voltage at $V_3$. This allows the total power and current demand of the load to exceed the maximum power and current capacity of the generating system while still maintaining the bus voltage at or near the minimum voltage $V_3$. Preferably, if the bus voltage falls below $V_3$, an overload condition is detected and the system is shut down, although a small overload may be permitted for a short duration of time.

Figure 7:
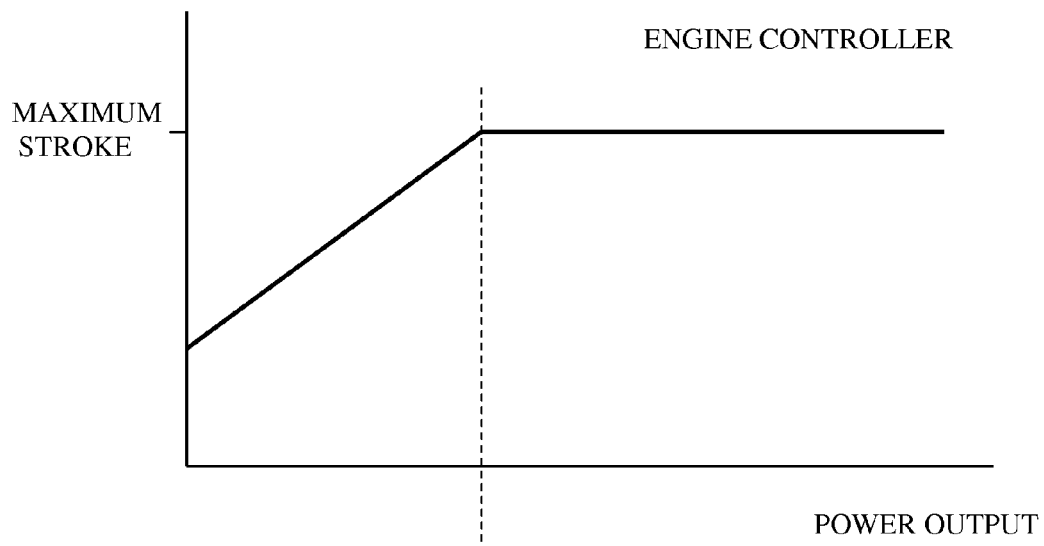
FIG. 7 is a graph illustrating the operation of a Stirling engine controller used in embodiments of the invention.
Figure 8:
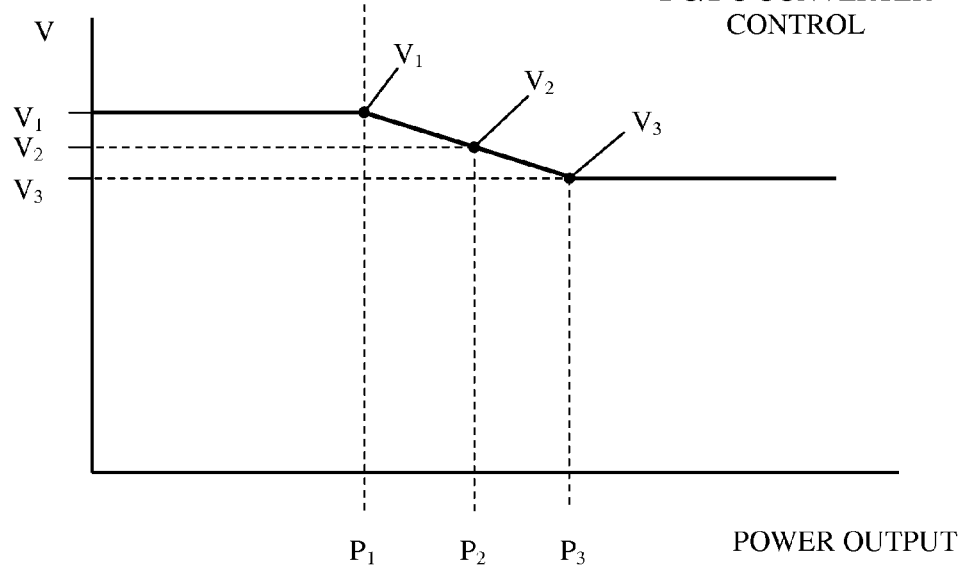
FIG. 8 is a graph illustrating the operation of a bidirectional DC/DC converter used in embodiments of the invention.

Referring to FIGS. 7 and 8, the electronic engine/alternator controller modulates the piston stroke to attempt to maintain a constant bus voltage $V_1$ over a range of output load demands less than $P_1$. The engine/alternator controller is able to maintain the bus voltage at $V_1$ so long as the power demand of the load does not exceed a limit $P_1$ because the controller is able to increase the stroke and thereby increase the power output from the alternator in response to an increased load demand that does not exceed a total demand greater than $P_1$. When the load demand exceeds the power limit $P_1$, the bus voltage begins to decline because engine stroke has reached its maximum so it can not be increased further to increase power output. Consequently, in the power supply range from 0.0 $W_e$ to $P_1$, the stroke of the engine piston is modulated by the engine controller between a maximum and a minimum stroke to maintain the bus voltage at a design nominal bus voltage (V1). The battery can also be charged in this range if it is discharged. Therefore, in this state, the bidirectional DC/DC converter is switched to the state that permits the battery to be charged, if it is not charged.

The engine/alternator operates in this state when and so long as the bus voltage does not fall below the design nominal bus voltage (V1). However, as known in the art, in order to avoid damage to the Stirling engine or alternator, there is a maximum piston stroke that can not be exceeded. Consequently, after that maximum stroke is reached, a further increase in load demand above $P_1$ causes the bus voltage to begin to fall. The more $P_1$ is exceeded, the more the bus voltage falls.

Under all the conditions described herein, ordinarily for power demand no greater than $P_3$, the engine controller continues to operate in the above manner. The engine controller is unaffected by changes in the state of the bidirectional DC/DC converter. Consequently, whenever the power demand exceeds $P_1$, the Stirling engine is operating at its maximum piston stroke.

Whenever the power demand exceeds $P_1$ and the bus voltage is in the range between the design nominal bus voltage ($V_1$) and the design minimum battery charging bus voltage ($V_2$), [which is less than the design nominal bus voltage ($V_1$)], the bidirectional DC/DC converter is switched to the state that permits the battery to be charged, if it is not charged, and power is supplied to the load by the engine/alternator. In the range $V_2 < V \leq V_1$, the designer has determined that the load can operate properly at a bus voltage within that range and there is enough power available from the engine/alternator to both meet the power demand of the load and charge the battery.

If the power demand increases beyond $P_2$ but is less than $P_3$ causing the bus voltage to drop into the range between the design minimum battery charging bus voltage ($V_2$) and a design minimum bus voltage ($V_3$), [which is less than the design minimum battery charging bus voltage ($V_2$)], the Stirling engine continues operating at the maximum piston stroke but bidirectional DC/DC converter is switched to a disconnected state so that the battery is disconnected and can not be charged. This is done because, in the range $V_3 < V \leq V_2$, the designer has determined that the load can operate properly at a bus voltage within that range and that the power demand of the load is so high that, although the engine/alternator can supply the power demand of the load, the battery can not also be charged because there is insufficient power available from the engine/alternator to both supply the load and charge the battery.

If the power demand of the load reaches $P_3$ and causes the bus voltage to drop to $V_3$, the engine alternator continues operating at its maximum stroke but the state of the bidirectional DC/DC converter is switched to apply power from the battery to the bus for maintaining the bus voltage at the design minimum bus voltage ($V_3$). This is done because the designer has determined that the load can not operate properly at a bus voltage less than $V_3$ and that the power supplied from the alternator operating at its maximum stroke is less than the power demand of the load so the power must be supplemented to maintain the design minimum bus voltage ($V_3$). The regulator that is a part of the bidirectional DC/DC converter, works to supply enough power from the battery to maintain the bus voltage at $V_3$.

The above described states, conditions and operation are summarized in FIG. 6. Under all these conditions, the control for the engine/alternator operates according to the same control algorithm that it does in the absence of the battery and bidirectional DC/DC converter of the invention. The engine controller continues to respond to the load "seen" at the bus and to modulate the engine stroke as a function of that load and bus voltage V. The effect of the battery and bidirectional converter is only to change the load "seen" by the generating system as a result of the battery being in one of its states of supplying power, being charged or being disconnected. For example, when the battery is being charged, the engine/alternator control still modulates the engine stroke. If the user load is removed, then, as the battery charges, the stroke is continuously and gradually reduced until there is no load. Connection of the battery and bidirectional converter to the bus of the generating system does not make it necessary to modify the control algorithm for controlling the engine/alternator, to provide additional inputs to it or to interconnect the controls.

By using an apparatus embodying these principles or operating according to the methods described above, more power can be temporarily delivered to the load than the alternator/engine generating system alone can supply. The time interval during which the additional power can be supplied is dependent upon the capacity of the battery. Battery recharging occurs automatically whenever load conditions permit and at a charging rate that the generating system can deliver under the existing conditions without deteriorating the power supply to the user load. All this occurs automatically, without requiring any manual input, such as changing connections or switching manually operated switches. By way of example, an engine/alternator generating system that can deliver up to 80 watts can, with simultaneous battery supply, temporarily supply 150 watts to a user load for a period of 10 minutes.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for operating an electrical power source, the power source having a free-piston Stirling engine including a piston driving a linear alternator connected through a rectifier to a bus to apply a voltage to the bus, the power source also having a battery, the method allowing the electrical power supplied from the power source to a load to, at times, exceed the maximum power that can be delivered from the free-piston Stirling engine driving the linear alternator, the method comprising:
   (a) modulating the stroke of the engine piston between a maximum and a minimum stroke to maintain the bus voltage at a design nominal bus voltage ($V_1$) and charging the battery if it is not charged, when and so long as the bus voltage does not fall below the design nominal bus voltage ($V_1$);
   (b) operating the Stirling engine at the maximum piston stroke and charging the battery if it is not charged when the bus voltage is in the range between the design nominal bus voltage ($V_1$) and a design minimum battery charging bus voltage ($V_2$) that is less than the design nominal bus voltage ($V_1$);
   (c) operating the Stirling engine at the maximum piston stroke and disconnecting the battery so it can not charge when the bus voltage is in the range between the design minimum battery charging bus voltage ($V_2$) and a design minimum bus voltage ($V_3$) that is less than the design minimum battery charging bus voltage ($V_2$); and
   (d) operating the Stirling engine at the maximum piston stroke and applying power from the battery to the bus for maintaining the bus voltage at the design minimum bus voltage ($V_3$) when the power supplied from the alternator operating at its maximum stroke is less than the power demand of the load.

2. An electrical power source having a free-piston Stirling engine including a piston driving a linear alternator and a battery for allowing the electrical power supplied from the power source to a load to, at times, exceed the maximum power that can be delivered from the free-piston Stirling engine driving the linear alternator, the power source further comprising:
   (a) a Stirling engine controller, including a rectifier connected between the alternator and a bus to apply a voltage to the bus, the controller modulating the piston stroke between a maximum and a minimum stroke to maintain the bus voltage at a design nominal bus voltage ($V_1$) when and so long as the bus voltage does not fall below the design nominal bus voltage ($V_1$) and charging the battery if it is not charged, the controller also maintaining the maximum piston stroke when the bus voltage falls below the design nominal bus voltage ($V_1$);
   (b) a bidirectional DC/DC converter connected between the battery and the bus, the DC/DC converter having a DC/DC converter control connected to and controlling the bidirectional DC/DC converter, the converter control including
      (i) a voltage sensor having a sensing input connected to the bus to sense the voltage of the bus,
      (ii) a battery charge state sensor having a sensing input connected to the battery to sense the charge state of the battery,
      (iii) a control logic circuit connected to an output of the voltage sensor and to an output of battery charge state sensor, the control logic circuit
         (1) initiating charging of the battery, if the battery is not charged, when the bus voltage is at the nominal bus voltage ($V_1$) or is in the range between the design nominal bus voltage ($V_1$) and a design minimum battery charging bus voltage ($V_2$) that is less than the design nominal bus voltage ($V_1$),
         (2) disconnecting the battery so it can not charge when the bus voltage is in the range between the design minimum battery charging bus voltage ($V_2$) and a design minimum bus voltage ($V_3$) that is less than the design minimum battery charging bus voltage ($V_2$), and
         (3) applying power from the battery through the bidirectional DC/DC converter to the bus to maintain the bus voltage at the design minimum bus voltage ($V_3$) when the power supplied from the alternator operating at its maximum stroke is less than the power demand of the load.

3. An electrical power source in accordance with claim 2 wherein the Stirling engine controller and a control circuit for the bidirectional DC/DC converter both use the same digital signal processor, microcontroller or other programmable microprocessor based controller.

* * * * *